(12) United States Patent
Prater et al.

(10) Patent No.: US 6,299,358 B1
(45) Date of Patent: Oct. 9, 2001

(54) UV-TRANSPARENT ELEMENTS FOR HARD DISK DRIVE COMPONENTS

(75) Inventors: Walter Lloyd Prater; Eric Martin Albertson, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,703

(22) Filed: Aug. 31, 1999

(51) Int. Cl.[7] .............................. F16C 35/08; B32B 31/28
(52) U.S. Cl. ...................... 384/537; 384/585; 360/99.08; 360/265.6; 310/42; 310/67 R; 310/90; 156/275.5; 156/275.7; 156/293; 29/898.07
(58) Field of Search ............................ 156/273.3, 275.3, 156/275.5, 275.7, 293; 29/596, 598, 898.07; 384/537, 585; 310/42, 67 R, 90; 360/99.04, 99.08, 265.6

(56) References Cited

U.S. PATENT DOCUMENTS

| | | | |
|---|---|---|---|
| 5,411,338 | * | 5/1995 | Goto ..................................... 384/537 |
| 5,459,361 | * | 10/1995 | Morioka ............................... 310/67 R |
| 5,596,235 | * | 1/1997 | Yazaki et al. ...................... 310/67 R |

OTHER PUBLICATIONS

IBM Corporation Technical Disclosure/vol. 36, No. 32, Feb. 1993 "Hard–Disk Spindle Motor Assembly Having a Spacer Ring Through Which Nitrogen Gas or UV Light Can Pass".
IBM Corporation Technical Disclosure/vol. 37, No. 04A, Apr. 1994 "Nitrogen and UV Pass–Thru Preloader".

* cited by examiner

Primary Examiner—Sam Chuan Yao
Assistant Examiner—Michael A. Tolin
(74) Attorney, Agent, or Firm—Robert B. Martin; Bracewell & Patterson, L.L.P.

(57) ABSTRACT

Ultraviolet-transparent seals, flange, and sleeve assemblies are used in actuator pivot cartridges for hard disk drives to cure adhesive located inside the pivot housing. The assemblies are formed from silica glass, polymers, or other suitable materials, and focus UV light into hard to reach, high aspect ratio areas between the pivot bearings, sleeve, and shaft. Some of the assemblies use transparent components with convex or fresnel lenses formed into their geometry. With these designs, UV light can enter the pivots axially and/or radially to reach and cure the adhesive regardless of its location.

35 Claims, 3 Drawing Sheets

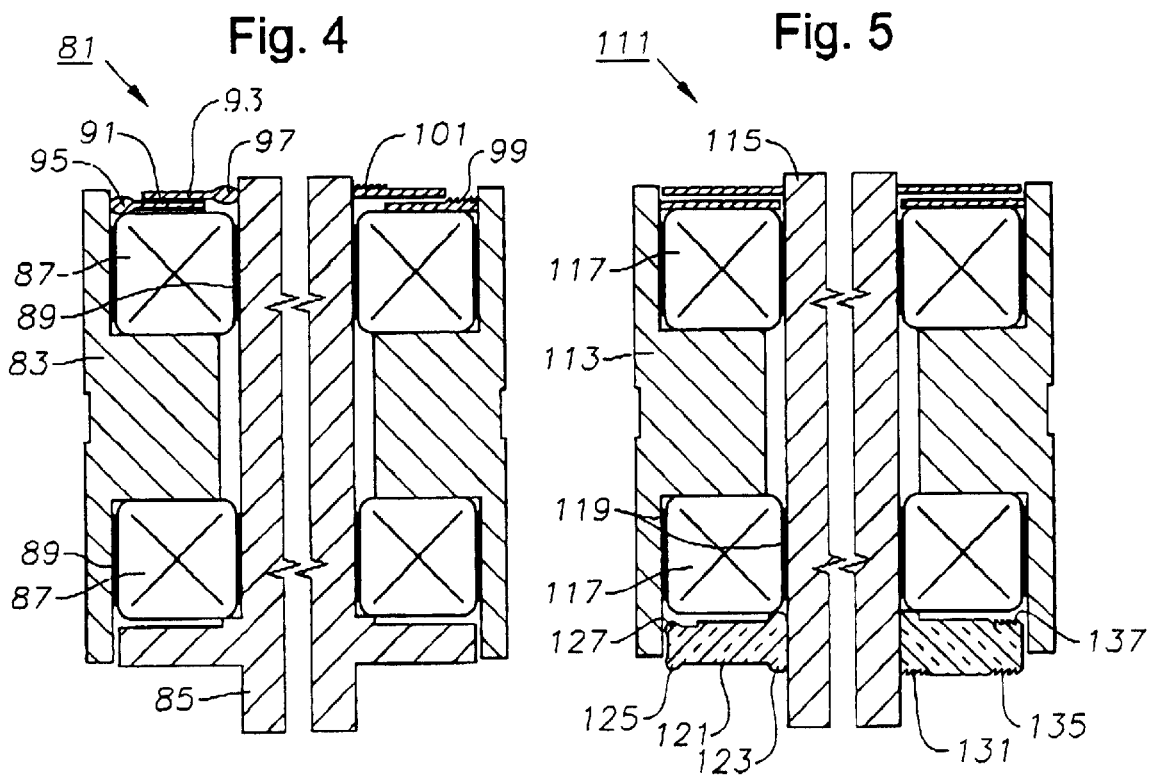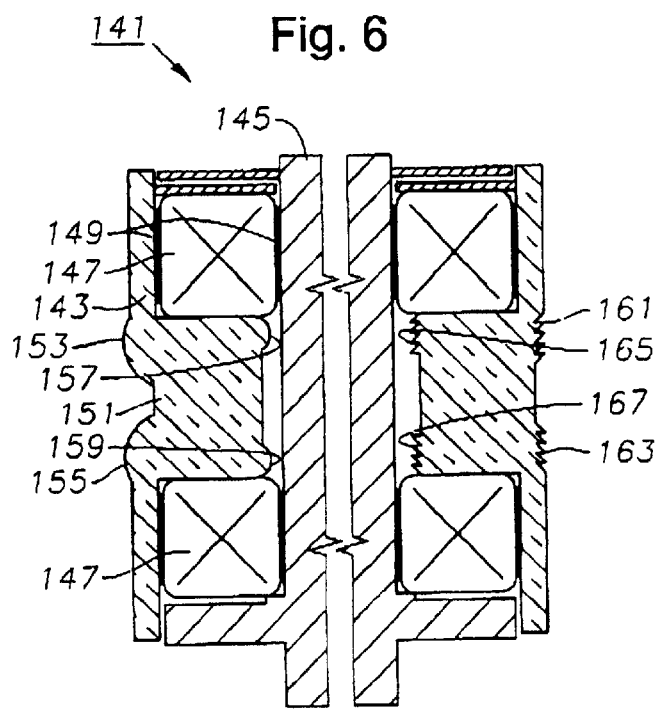

UV-TRANSPARENT ELEMENTS FOR HARD DISK DRIVE COMPONENTS

BACKGROUND OF THE INVENTION

1. Technical Field

This invention relates in general to actuator pivot cartridges in hard disk drives and in particular to UV-transparent elements for allowing photosetting adhesives to cure in the actuator pivot cartridge or spindle motor assembly of a hard disk drive.

2. Background Art

Referring to FIG. 1, an information storage system comprising a hard disk drive 11 is shown. Drive 11 has a base 13 containing a plurality of stacked, parallel magnetic disks 15 (one shown) which are closely spaced apart. Disks 15 are rotated by a spindle motor located therebelow about a central drive hub 17. An actuator 21 is rotatably mounted to base 13 about an actuator pivot assembly 23. A controller 25 is mounted to base 13 for selectively pivoting actuator 21. Actuator 21 has a mounting support 27, cantilevered load beams or suspensions 29 extending from mounting support 27, and a head gimbal assembly 31 having at least one magnetic read/write head secured to each suspension 29 for magnetically reading data from or magnetically writing data to disks 15. Suspensions 29 have a spring-like quality which biases or maintains them in parallel relationship relative to one another. A motor assembly 33 having a conventional voice coil motor is also mounted to pivot assembly 23 opposite head gimbal assemblies 31. Movement of actuator 21 (indicated by arrows) moves head gimbal assemblies 31 radially across tracks on the disks 15 until the heads on assemblies 31 settle on the target tracks.

Referring now to FIG. 2, pivot assembly 23 contains a set of bearings 35. A photosetting, anaerobic adhesive 37 is used to bond and seal the races of bearings 35 to a stationary housing 39 and an internal pivot shaft 45. Some adhesive 37 is located in the very small, circumferential gaps 46, 48 (approximately one to ten microns each) which extend between each bearing 35, and shaft 45 and housing 39, respectively. A hole 40 extends through the side of housing 39 into its interior and is used for mounting purposes.

Typically, the adhesive 37 is cured by passing the assembled pivots 23 under a UV light source (not shown). However, due to geometrical constraints, such as the opaque flange 43 on the pivot shaft 45, access to adhesive 37 is severely limited. In addition, the small size of gaps 46, 48 makes access to them severely limited. Most of the emitted light 41 reflects off the pivot and oven surfaces with few UV rays penetrating gaps 46, 48 and the narrow slit or space 47 (approximately 0.1 mm in width) between the circumference of flange 43 and the inner diameter of housing 39. This results in joints with uncured adhesive and lower bond strengths. When the pivots 23 are later subjected to file operating temperatures, the uncured or poorly cured adhesive can lead to loss of pivot preload or head and disk contamination from volatile pivot adhesive.

To solve this problem, pivot manufacturers have increased the number of passes made through the UV oven. For some pivots, a minimum of five passes through the oven are required to cure the adhesive in all areas of the pivots. Another option is to increase the time the pivots are exposed to the UV light to ensure that the adhesive has sufficiently cured. Unfortunately, these solutions require more power and longer process times which result in increased manufacturing costs and process inefficiencies.

SUMMARY OF THE INVENTION

Ultraviolet-transparent seals, flange, and sleeve assemblies are used in actuator pivot cartridges for hard disk drives to cure adhesive located inside the pivot housing. The assemblies are formed from silica glass, polymers, or other suitable materials, and focus UV light into hard to reach, high aspect ratio areas between the pivot bearings, sleeve, and shaft. Some of the assemblies use transparent components with convex or fresnel lenses formed into their geometry. With these designs, UV light can enter the pivots axially and/or radially to reach and cure the adhesive regardless of its location.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 4 is a split sectional side view showing, on the left side, a second embodiment of the cartridge of FIG. 3, and, on the right side, a third embodiment of the cartridge of FIG. 3.

FIG. 5 is a split sectional side view showing, on the left side, a fourth embodiment of the cartridge of FIG. 3, and, on the right side, a fifth embodiment of the cartridge of FIG. 3.

FIG. 6 is a split sectional side view showing, on the left side, a sixth embodiment of the cartridge of FIG. 3, and, on the right side, a seventh embodiment of the cartridge of FIG. 3.

BEST MODE FOR CARRYING OUT THE INVENTION

Figure 3:
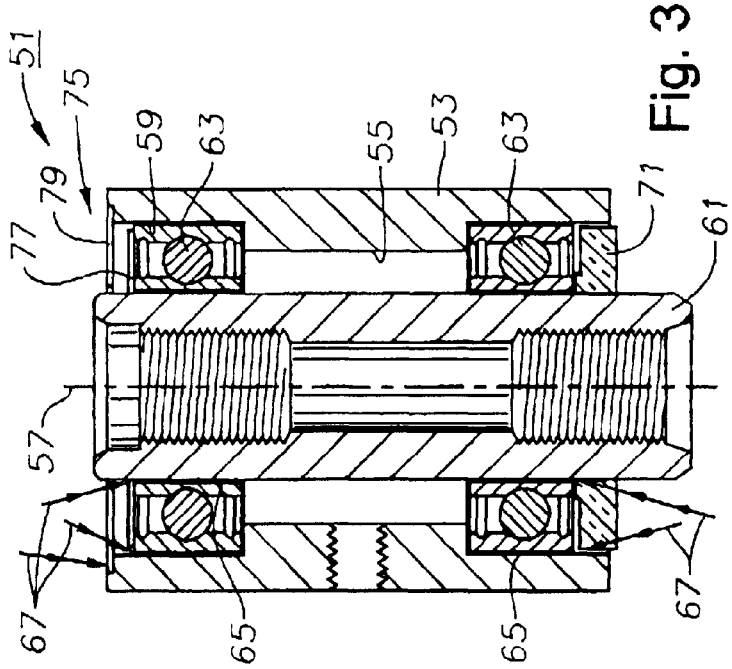
FIG. 3 is a sectional side view of a first embodiment of an actuator pivot cartridge constructed in accordance with the invention.
Figure 2:
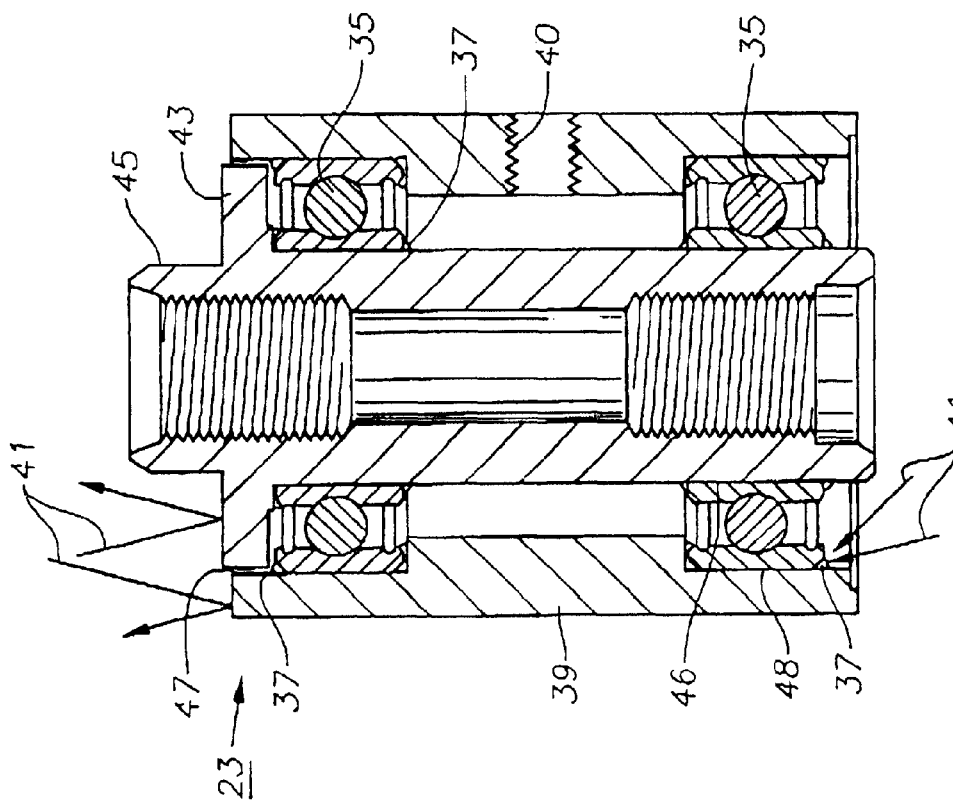
FIG. 2 is a sectional side view of a prior art actuator pivot cartridge in the disk drive of FIG. 1.

Referring to FIG. 3, a first embodiment of a hard disk drive actuator pivot cartridge 51 constructed in accordance with the invention is shown. Note that the novel features incorporated into pivot cartridge 51 are readily applicable to other rotational devices as well, such as spindle motor cartridges. However, for simplicity, the various embodiments of the invention will be discussed only in terms of actuator pivot cartridges.

Pivot cartridge 51 comprises a generally cylindrical, outer housing 53 having a central bore 55 with a longitudinal axis 57. Housing 53 also has a counterbore 59 on each of its axial ends. A bearing 63 is mounted in each counterbore 59. A drive shaft 61 is pivotally or rotationally mounted inside bore 55 along axis 57. The inner races of bearings 63 contact and support shaft 61, and the outer races of bearings 63 contact housing 53. The races of bearings 63 are permanently bonded to housing 53 and shaft 61 with anaerobic adhesive 65 or the like. FIG. 3 schematically illustrates how adhesive 65 is cured during manufacturing assembly by exposure to UV light 67 such as that emitted by a UV oven.

Figure 1:
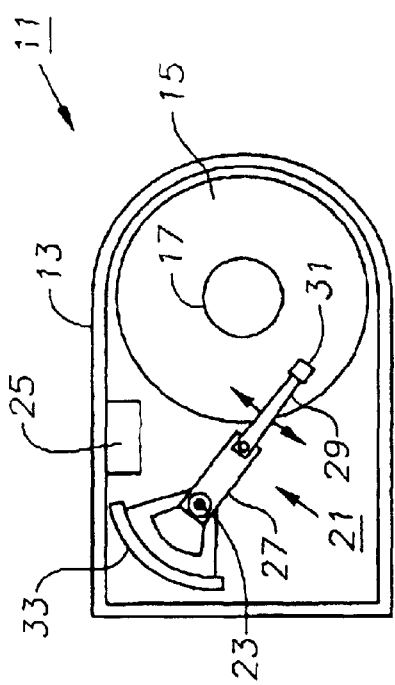
FIG. 1 is a top schematic view of a prior art hard disk drive.

Cartridge 51 has a first or lower flange 71 that is mounted to shaft 61 and extends radially outward toward housing 53. Flange 71 is free of contact with housing 53 and separated therefrom by a small clearance. Flange 71 provides a stable structure for mounting cartridge 51 to a base casting (see FIG. 1). In addition, flange 71 is transparent to UV light or, in the alternative, formed with a UV-transparent window. Thus, flange 71 redirects the UW light incident upon cartridge 51 into the interior of cartridge 51 to cure at least some of the adhesive 65 that secures the lower bearing 63 adjacent to it. Flange 71 or its window may also be fitted with a lens for focusing or concentrating the UV light onto the precise locations of adhesive 65.

A labyrinth seal 75 is mounted to the upper end of cartridge 51 for preventing the escape of grease volatiles from bearings 63. Seal 75 comprises a pair of flanges 77, 79 that extend radially from shaft 61 and housing 53, respectively. Small annular clearances are provided between flange 77 and housing 53, and between flange 79 and shaft 61. Flanges 77, 79 are axially separated from each other by a small gap. Like flange 71, flanges 77, 79 are either formed from UV-transparent materials or have UV-transparent windows for redirecting UV light toward the adhesive 65 that bonds the upper bearing 63 to cartridge 51.

Referring now to the left half of FIG. 4, a second embodiment of the invention is shown as pivot cartridge 81. Cartridge 81 comprises a housing 83 with a coaxial shaft 85 and a pair of bearings 87 bonded with adhesive 89 therebetween. Cartridge 81 has a pair of flanges 91, 93 at its upper axial end that are similar to those of cartridge 51. Flanges 91, 93 extend radially from shaft 85 and housing 83, respectively, with small clearances on their unsupported ends. Flanges 91, 93 overlap each other and are separated by an axial gap. Each flange 91, 93 has a VV-transparent, annular lens 95, 97 on its respective mounting end. The outer edge of upper flange 93 terminates radially inward from lens 95 in lower flange 91 so that lens 95 is exposed. Lenses 95, 97 may comprise convex lenses (left side of FIG. 4), or, in a third embodiment, fresnel lenses 99, 101 (right side of FIG. 4). Lens 101 is located near shaft 85 and lens 99 is located next to housing 83 to direct UV light toward adhesive 89. With either set of lenses, UV light incident on cartridge 81 is redirected, concentrated, and focused on adhesive 89 to enhance curing.

FIG. 5 illustrates fourth and fifth embodiments of the invention in a pivot cartridge 111. Like the preceding embodiments, cartridge 111 has a housing 113, a coaxial pivot shaft 115, and bearings 117 bonded with adhesive 119 therebetween. Cartridge 111 has a flange 121 with UV-transparent windows that extend radially from shaft 115. Flange 121 has a series of annular lenses that redirect UV-light onto adhesive 119 to cure it. A first lens 123 is located on the outer axial surface of flange 121 at its inner radial edge. Second and third lenses 125, 127 are located at the outer radial edge of flange 121, on its outer and inner axial surfaces, respectively. Lenses 123, 125, 127 concentrate and focus the UV light into cartridge 111 and the cure the adhesive 119 adjacent thereto. Lenses 123, 125, 127 may comprise convex lenses (left side of FIG. 5) 5 or, in the fifth embodiment, fresnel lenses 131, 135, 137 (right side of FIG. 5).

Referring now to the left half of FIG. 6, a sixth embodiment of the invention is shown as pivot cartridge 141. Cartridge 141 comprises a housing 143 with a coaxial shaft 145 and a pair of bearings 147 bonded with adhesive 149 therebetween. Cartridge 141 has a UV-transparent, annular window 151 in housing 143 for redirecting UV light on adhesive 149, or the entire housing 143 may be formed from UV-transparent material. Preferably, window 151 has a set of annular lenses formed therein for concentrating and focusing the UV light. The first and second lenses 153, 155 are located on the outer radial surface of window 151 at its upper and lower axial edges, respectively. The third and fourth lenses 157, 159 are located on the inner radial surface of window 151 at its upper and lower axial edges, respectively. Lenses 153, 155, 157, 159 may comprise convex lenses (left side of FIG. 6) or, in a seventh embodiment, fresnel lenses 161, 163, 165, 167 (right side of FIG. 6).

Figure 7:
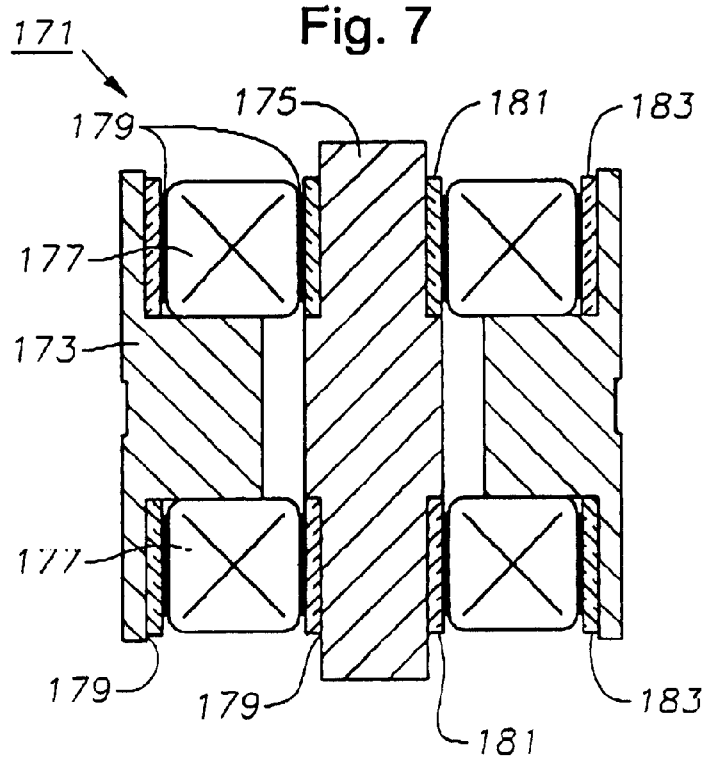
FIG. 7 is a sectional side view of a eighth embodiment of the cartridge of FIG. 3.

An eighth embodiment of the invention is schematically depicted in FIG. 7 as pivot cartridge 171. Like the preceding embodiments, cartridge 171 has a housing 173, a coaxial pivot shaft 175, and bearings 177 bonded therebetween with adhesive 179. The improvement in cartridge 171 comprises a set of thin-walled, cylindrical inserts or sleeves. A small diameter sleeve 181 is located between each inner race of bearings 177 and shaft 175, and a large diameter sleeve 183 is located between each outer race of bearings 177 and housing 173 for a total of four sleeves. In the embodiment shown, adhesive 179 is located between and used to bond sleeves 181, 183 to housing 173, shaft 175, and bearings 177. Sleeves 181, 183 are UV-transparent for redirecting and concentrating UV light on adhesive 179.

Figure 8:
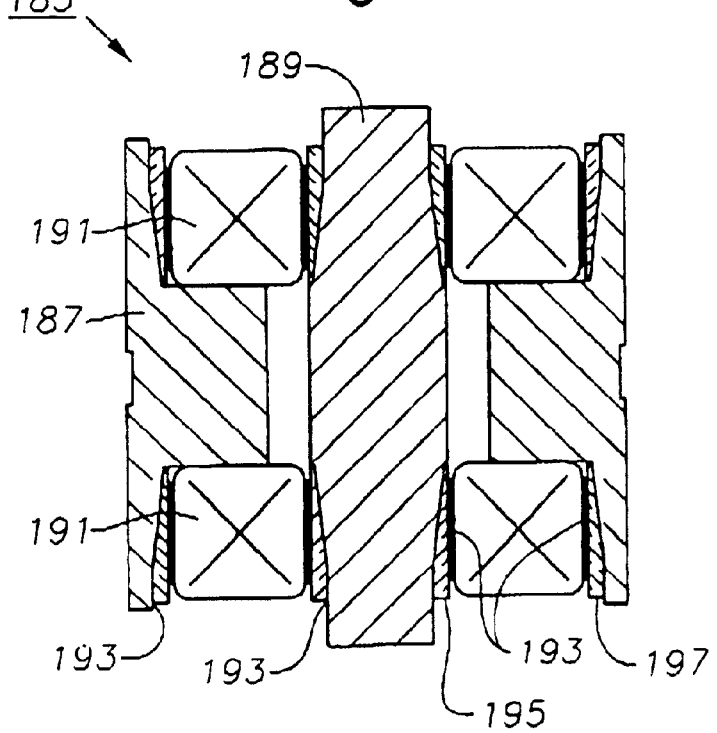
FIG. 8 is a sectional side view of a ninth embodiment of the cartridge of FIG. 3.

Referring now to FIG. 8, the ninth embodiment of the invention is shown as pivot cartridge 185. Cartridge 185 is almost identical to cartridge 171, including a housing 187, a shaft 189, bearings 191, and adhesive 193 therebetween. However, the contact surfaces between these components are tapered as shown to accommodate a set of tapered thin-walled sleeves. A small diameter sleeve 195 is located between each inner race of bearings 191 and shaft 189, and a large diameter sleeve 197 is located between each outer race of bearings 191 and housing 187 for a total of four sleeves. Sleeve 195 has a frustoconical interior that tapers and a cylindrical exterior. Sleeve 197 has a frustoconical exterior that tapers and a cylindrical interior. As in cartridge 171, the adhesive 193 in cartridge 185 is located between and used to bond sleeves 195, 197 to housing 187, shaft 189, and bearings 191. Sleeves 195, 197 are UV-transparent for redirecting and concentrating UV light reflected from the tapered surface onto adhesive 193.

The invention has significant advantages. The various devices and methods described for curing obstructed photosetting compounds can reduce curing cycle times for some pivot assemblies by 80 to 90% and decrease production costs. Even hard to reach areas of an assembly can be readily accessed with the invention. The UV-transparent seals and flange also focus and concentrate the UV light rays.

While the invention has been shown or described in only some of its forms, it should be apparent to those skilled in the art that it is not so limited, but is susceptible to various changes without departing from the scope of the invention. In addition, each of these design is also applicable to disk drive spindle motors.

We claim:

1. An apparatus for a hard disk drive, comprising:
   a housing having a bore with a central axis, and two axial ends;
   a shaft coaxially mounted within the bore of the housing for rotation relative thereto;
   a bearing mounted adjacent to each axial end of the housing between the housing and the shaft;

adhesive located in clearances between the housing and each bearing and clearances between the shaft and each bearing for bonding the bearings to the housing and the shaft, the adhesive being curable by light of a selected wavelength; and a member mounted to the apparatus that is capable of transmitting light of the selected wavelength, the member being adjacent to at least one of the clearances for transmitting light incident on the apparatus during assembly into said at least one of the clearances to cure at least some of the adhesive.

2. The apparatus of claim 1 wherein the member has a lens contour formed thereon for redirecting the light being transmitted.

3. The apparatus of claim 1 wherein the member comprises an annular flange extending radially substantially across an annular space between the housing and the shaft on one of the axial ends of the housing.

4. The apparatus of claim 3 wherein the flange has a convex lens contour formed thereon for axially converging the light being transmitted.

5. The apparatus of claim 3 wherein the flange has a fresnel lens contour formed thereon for axially converging lip the light being transmitted.

6. The apparatus of claim 1 wherein the member comprises a first flange extending radially outward from the shaft with an outer edge that is free of contact with the housing, and a second flange extending radially inward from the housing with an inner edge that is free of contact with the shaft, and wherein the first and second flanges are mutually adjacent to one of the axial ends of the housing and are axially spaced apart from each other.

7. The apparatus of claim 6, further comprising a convex lens on each of the flanges.

8. The apparatus of claim 6, further comprising a fresnel lens on each of the flanges.

9. The apparatus of claim 1 wherein the member is cylindrical and is coaxially formed in a sidewall of the housing between its axial ends.

10. The apparatus of claim 9 wherein the lens comprises a convex lens.

11. The apparatus of claim 9 wherein the lens comprises a fresnel lens.

12. The apparatus of claim 1 wherein the member is mounted to the shaft.

13. The apparatus of claim 1 wherein the member is mounted is to the housing.

14. The apparatus of claim 1 wherein the member comprises a sleeve located between at least one of the bearings and the housing.

15. The apparatus of claim 1 wherein the member comprises a sleeve located between at least one of the bearings and the shaft.

16. The apparatus of claim 15 wherein the member comprises a first sleeve located between at least one of the bearings and the housing, and a second sleeve located between said at least one of the bearings and the shaft.

17. The apparatus of claim 16 wherein each of the sleeves has a tapered wall.

18. A rotational device for a hard disk drive, comprising:
a generally cylindrical housing having a central bore with an axis and an axial end;
is a shaft coaxially mounted within the bore of the housing for rotation relative thereto;
a bearing mounted adjacent to the axial end of the housing and having an inner race that contacts the shaft, and an outer race that contacts the housing;

anaerobic adhesive located between the housing and the outer race of the bearing, and the shaft and the inner race of the bearing for bonding the respective races thereto; and an annular flange mounted to one of the housing and the shaft and extending radially therefrom adjacent to the axial end of the housing, the flange having a portion that is UV-transparent for transmitting UV light incident on the rotational device onto the adhesive during assembly to cure the adhesive.

19. The rotational device of claim 18 wherein the flange has an outer axial surface, an inner axial surface, an outer radial edge, and an inner radial edge.

20. The rotational device of claim 18 wherein the flange comprises a lens for redirecting the light being transmitted.

21. The rotational device of claim 18 wherein the flange has a convex lens.

22. The rotational device of claim 18 wherein the flange has a fresnel lens.

23. The rotational device of claim 18 wherein the flange is mounted to the shaft.

24. The rotational device of claim 18 wherein the flange is mounted to the housing.

25. The rotational device of claim 18 wherein the flange comprises a first flange extending radially outward from the shaft, free of contact with the housing, and a second flange is provided extending radially inward from the housing, free of contact with the shaft, and wherein the first and second flanges are mutually adjacent to the axial end of the housing and are axially spaced apart from each other.

26. A rotational device for a hard disk drive, comprising:
a generally cylindrical housing having a central bore with an axis, and an axial end;
a shaft coaxially mounted within the bore of the housing for rotation relative thereto;
a bearing mounted adjacent to the axial end of the housing and having an inner race and an outer race;
an annular outer sleeve mounted between the housing and the outer race of the bearing;
an annular inner sleeve mounted between the shaft and the inner race of the bearing;
anaerobic adhesive located between the shaft and the inner sleeve, the inner sleeve and the inner race, the outer race and the outer sleeve, and the outer sleeve and the housing; and wherein
the sleeves are UV-transparent for directing UV light incident on the rotational device during assembly into the housing to cure the adhesive.

27. The rotational device of claim 26 wherein at least one of the sleeves has a wall that is tapered in thickness.

28. The rotational device of claim 26 wherein each of the sleeves has a wall that is tapered in thickness, with an axial outer end of each sleeve being thicker than an axial inner end of each sleeve.

29. The rotational device of claim 26 wherein at least one of the second inner and outer sleeves is tapered.

30. A rotational device for a hard disk drive, comprising:
a generally cylindrical housing having a central bore with an axis, two axial ends, and a side wall;
a shaft coaxially mounted within the bore of the housing for rotation relative thereto;
a bearing mounted adjacent to each axial end of the housing, each bearing having an inner race that contacts the shaft, and an outer race that contacts the housing;

anaerobic adhesive located between the housing and each outer race and between the shaft and each inner race for bonding the outer races of the bearings to the housing and the inner races of the bearings to the shaft; and an annular window located in the side wall of the housing between the axial ends of the housing, the window being UV-transparent for transmitting UV light incident on the rotational device during assembly into the housing to cure the adhesive.

31. The rotational device of claim 30 wherein the window is located axially inward of the bearings.

32. The rotational device of claim 30 wherein the window comprises a lens for redirecting the transmitted light.

33. The rotational device of claim 30 wherein the window has axial edges and a lens contour formed adjacent to each of the axial edges.

34. A method for curing adhesive in an apparatus for a hard disk drive, comprising the steps of:

(a) providing an apparatus, the apparatus comprising a housing having a bore with an axis, two axial ends, a coaxial shaft, a bearing between the housing and the shaft, and adhesive between the housing and the shaft for bonding the bearing thereto;

(b) providing a window formed from solid materials and mounted to the apparatus that is capable of transmitting light of a selected wavelength into the apparatus;

(c) exposing the apparatus to the light of the selected wavelength such that at least some of the light enters and is transmitted by the window to cure at least some of the adhesive.

35. The method of claim 34 wherein step (b) comprises forming a lens contour on the apparatus for redirecting the light being transmitted.

* * * * *